Patented June 4, 1940

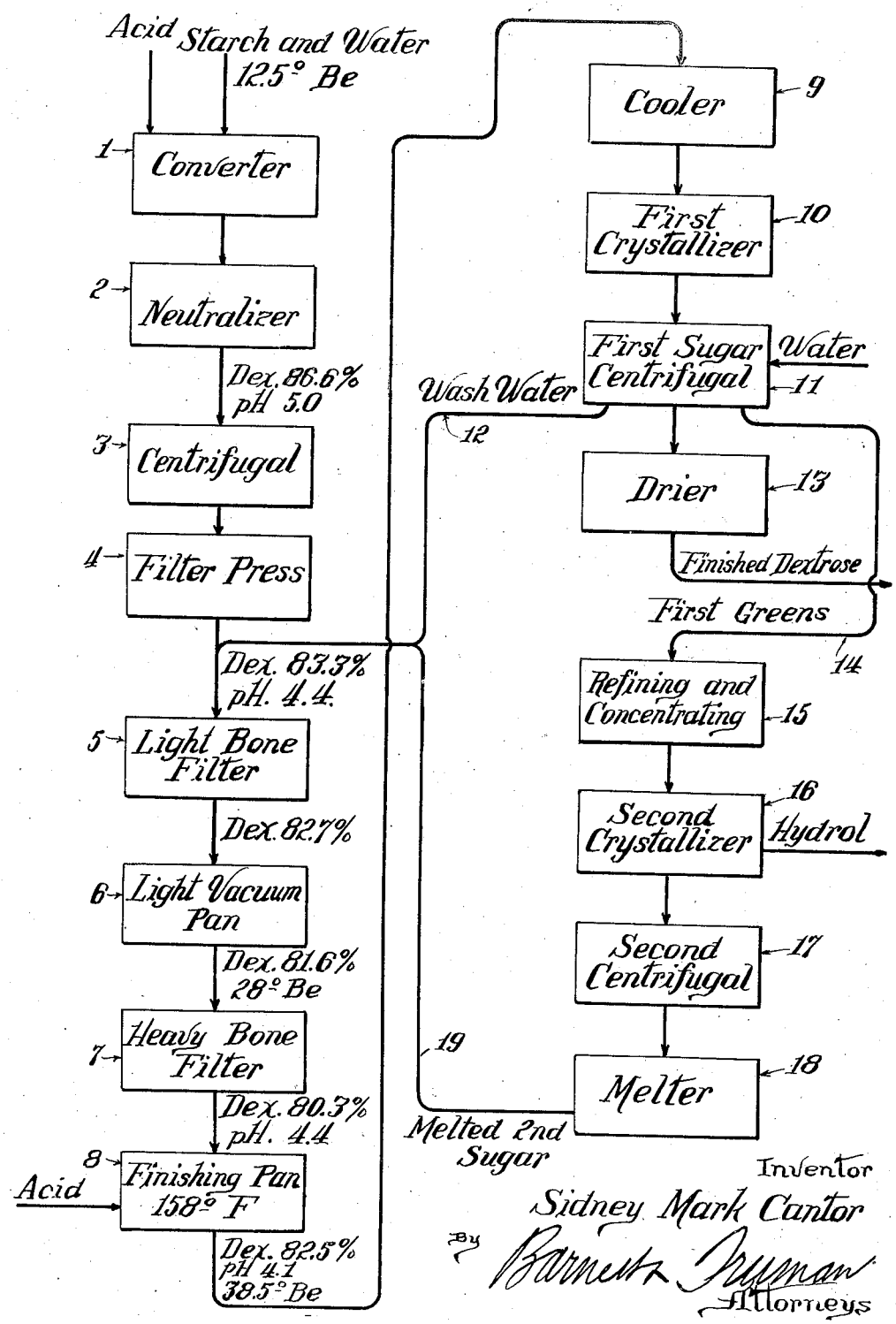

2,203,325

UNITED STATES PATENT OFFICE 2,203,325

PRODUCTION OF DEXTROSE FROM STARCH

Sidney Mark Cantor, Riverside, Ill., assignor to Corn Products Refining Company, New York, N. Y., a corporation of New Jersey Application November 25, 1938, Serial No. 242,262

10 Claims. (Cl. 127—38)

This invention relates to the production of dextrose, more particularly high purity crystalline or granular dextrose hydrate; and the principal objects of the invention are: to increase the yield, that is, the amount of dextrose obtained from a given quantity of starch; to produce a better quality of dextrose in respect particularly to color; and to provide a process in which there will be smaller volumes of liquids returned to the process, thus effecting an economy in the concentration and handling of such liquids.

More specifically the invention provides an improvement upon the process of making dextrose disclosed in United States patents to William B. Newkirk, No. 1,471,347, October 23, 1923, and No. 1,521,830, January 6, 1925, the latter patent being for certain improvements upon the fundamental process described in the first named patent.

According to the process of Patent No. 1,521,830, as practised at the present time, a starch and water suspension having a density of about 12°–14° Baumé and containing a hydrolyzing or converting acid, such as hydrochloric acid, is converted in an autoclave at 45 to 50 pounds steam pressure for a period of 25 to 27 minutes. The converted liquor is neutralized and subjected to certain refining operations including one or more adsorption treatments (the liquor being passed, for example, through bone-black filters) and is then concentrated in vacuum pans, in one or more operations, to a density between 39.5° and 40.5° Baumé. After cooling the liquor is introduced into standard type of crystallizers, provided with slow moving agitators, on massecuite (foots) from previous crystallizations in an amount to make up approximately 30%, by weight, of each new batch; the initial temperature of the mixture of converter liquor and foots being about 100° F., and the finishing temperature in the crystallizer about 70° F. When the crystallization of the batch is completed, the major portion of the massecuite, leaving enough for seeding the next batch, is withdrawn from the crystallizer and the mother liquor spun out from the crystals in centrifugal machines, the centrifuging operation being completed by the introduction of wash water into the machines for the purpose of removing residual mother liquor. The final purity of the sugar depends upon the crystal character of the massecuite, that is, its purgeability, upon the purity (dextrose content) of the mother liquor, and upon the amount of water used for washing. The lustre of the product is affected detrimentally by too much washing, and the larger the amount of wash water that is used, the more liquid will have to be returned to the process for retreatment. Hence, high purity of mother liquor and easy purgeability are highly desirable.

The mother liquor from the above described, that is, the first crystallizing operation is subjected to a second crystallizing operation, after refining and concentrating operations, and, possibly, after reconversion in an autoclave at high pressure, as disclosed for example, in United States patent to Charles J. Copland, No. 2,109,585, patented March 1, 1938. The mother liquor (first greens) thus treated is then crystallized in a crystallizer of the type above mentioned and by a similar process. The resultant second sugar massecuite is centrifuged and, with or without washing, may be either marketed, as a relatively low grade product, or it may be melted, as is more usual, and the melt mixed with the converter liquor going to the first crystallizer; to which may also be added the wash water from the first centrifugals.

It has been recognized that the converting density, as given above, 12°–14° Baumé, is higher than the optimum converting density, by which term is meant the density of the starch suspension which will yield a converted liquor of the highest purity or dextrose content. Operators, however, have nevertheless used converting densities as high as 12°–14° Baumé because of the economic disadvantages in using the lower Baumé liquors, such, for example, as increased cost of evaporation and need for larger amount of equipment to handle the larger volumes of liquor in proportion to dry substance content.

The optimum converting density is probably in the neighborhood of 9.5° Baumé (under present converting conditions, i. e. 45 pounds steam pressure and 106 pounds 28% hydrochloric acid for 6100 pounds dry substance starch); and this can be explained by reference to the reactions which take place during the conversion of the starch in the autoclave, and subsequently as has been discovered, during the latter steps of the process. These reactions are: (1) the hydrolysis of the starch to dextrose; (2) the reversion or polymerization or condensation of dextrose (a monosaccharide) to higher molecular weight sugars, this polymerizing reaction tending to reconvert the dextrose back into starch, although, of course, this end is never attained, the polymerization bringing about the formation of, probably, quite a large variety of polysaccharides having different characteristics; and (3) the destruction of dextrose and the formation of humic acids, or other similar acids, which give the ordinary converted solution its characteristic dark color. These reactions go on simultaneously, one dominating the others in accordance with the particular conditions prevailing at any particular stage of the process; and they do not, as has usually been assumed, cease with the termination of the converting operation in the autoclave, or even with the partial neutralization of the liquor which follows, but continue throughout the refining and concentration of the liquor and also throughout the crystallizing operation, which is a relatively protracted one requiring several days time. Even if the solution be in a state of substantially dynamic equilibrium at the end of the converting period, this equilibrium will be disturbed to a greater or less extent because of changing conditions during the later steps of the process, including changes in acidity, temperature, density, dextrose content, proportions of solid to liquid phase, etc. Reaction (1) operates, in the stages of the process subsequent to the converting stage, upon the polysaccharides, to reconvert them to dextrose, in opposition to the reaction (2) which tends to build up polysaccharides from the dextrose produced from the starch by reaction (1). Reactions (1) and (3) are uni-molecular. Reaction (2) is bi-molecular. Reaction (2) is therefore dependent upon the carbohydrate concentration of the liquor and proceeds faster when the concentration is high and more slowly when the concentration is reduced; while reactions (1) and (3) are independent of carbohydrate concentration. Reaction (3) depends particularly upon the strength of the acid, the temperature, and the length of time that the carbohydrate substance is in contact with the acid.

These considerations explain why a converting density of 12°–14° Baumé will give a converted liquor of lower dextrose content than a converting density of say 9.5° or 10° Baumé. The higher carbohydrate concentration favors reaction (2) and the polymerization of dextrose to polysaccharides. Naturally, if converting gravities lighter than 9.5° be employed, a liquor containing a higher dextrose content may be obtained, but only by increase of the time factor, which is uneconomical, and the use of more acid, which latter will tend to bring about increased destruction of dextrose. The density which has been termed the optimum converting density, that is, one between 9° and 10° Baumé, is one which takes all these factors into consideration.

Processes for reconversion of dextrose solutions in the converters such as are used for the primary starch conversion, and under similar conditions, namely, high pressures and temperatures, have been utilized for increasing dextrose content of liquors to be subsequently re-crystallized, such as hydrols or spent mother liquors, from which the dextrose has been removed to the greatest extent possible (United States patents to Ebert, et al., No. 1,673,187, June 12, 1928, and No. 1,704,037, March 5, 1929; British patent to Marks, No. 290,847, June 15, 1927); and such as first greens (United States patent to Charles J. Copland, No. 2,109,535, March 1, 1938). However, all of these processes involve, whatever the liquor may be, its return to the autoclave for a converting treatment similar to the original starch conversion, that is, at high pressures and correspondingly high temperatures.

The present invention is based upon the discovery that dextrose solutions in the early stages of the process, that is, before crystallization has taken place, contain polysaccharides resulting from the polymerizing effect of reaction (2) which are so loosely bound, due, apparently, to the relatively short time of contact between the dextrose and the acid, that they may be de-polymerized with relatively small amounts of acid and at temperatures which are relatively low instead of requiring, as has been the case with solutions from the later stages of the process, temperatures corresponding to the usual converter pressures of 45 to 50 pounds per square inch or much larger quantities of acid. These loosely bound products of polymerization or partial polymerization are probably formed in part during the converting operation, but to a considerable extent are formed in the stages of the process following neutralization and preceding the centrifuging of the massecuite.

The loss of dextrose due to polymerization during the refining and concentrating stages of the process does not take place to any large extent, it has been found, if the conversion is at or near the optimum density. It takes place to a very marked extent where the usual commercial converting densities are used.

According to the present invention the pH of the liquor is reduced, after neutralization and at least before the completion of the crystallizing operation, so as to bring about the de-polymerization of the above-mentioned loosely bound polysaccharides. This de-polymerizing effect is produced by merely introducing additional acid into the liquor at one or other of the stages of the process indicated. Preferably, the acid is added to the liquor during concentration, for example, at the finishing vacuum pan, where the elevated temperature, about 150° F., aids in the desired reaction. The addition of the acid at this stage of the process, it is believed, would have very little effect upon the polysaccharides existing in a spent mother liquor, for example, in which polymerization has been fully completed, due to the long period of contact between the acid and the dextrose. Liquors of this sort require the high temperatures of the autoclave method disclosed in the patents above referred to. According to the present process, however, a liquor converted at say 12.5° Baumé and having a dextrose content of about 80% at the neutralizer, reduced at the end of the finishing pan operation to about 78%, may have its dextrose content increased to over 82% by the simple expedient of introducing a certain amount of acid into the finishing pan.

The process involves, preferably, the crystallization of the liquor thus treated at a density somewhat lower than the usual density of 40° Baumé. The ordinary converter liquor entering the crystallizer at about 40° Baumé contains 76% dry substance and 59.5% dextrose on total weight, dry substance plus liquid. With the increase of dextrose content brought about by the present invention, it is necessary in order to maintain the same crystallizing conditions, which are calculated to get as much dextrose out of the solution as possible, to reduce the dry substance content to approximately 72% or 38.5° Baumé, in order that the process will not have to be stopped before the maximum yield is obtained. Therefore, according to the preferred method of the present invention, the concentration of the liquor is stopped at a density which is lower than 40° Baumé in proportion as the dextrose content has been raised by the reduction of pH.

While the invention has been described as applied to a converter liquor obtained primarily from the conversion of starch, the process would have some advantage in the treatment of reconverting first greens or hydrols in distinction to un-reconverted mother liquors.

The invention will be best understood by reference to the accompanying flow sheet which shows a common process for dextrose production modified in accordance with the principles of the present invention.

Referring to the drawing, which is entirely diagrammatic, 1 designates a converter or autoclave into which is introduced 6100 pounds of dry substance starch with enough water to give a mixture of about 3250 gallons at an entering density of 12.5° Baumé, 106 pounds of 28% hydrochloric acid and steam to raise the pressure to about 45 pounds per square inch. The converting time may be about 27 minutes. Other converting acid beside hydrochloric acid might be used. The converted liquor passes into the neutralizing tank 2 where it is neutralized to pH 5.0 with sodium carbonate or other suitable neutralizing agent. The neutralized liquor passes to the centrifugal 3 with a dextrose content, say, of 86.6%. The dextrose contents here reported, it will be understood, are purely illustrative and in practice will depend upon conditions that are likely to vary from time to time. The liquor purged in centrifugal 3 of coagulated impurities passes to the filter press 4 and then, mixed with wash water and with melted second sugar (as will be described) to the light bone filter 5. The mixture of liquors going to the light bone filter may have a dextrose content of 83.3% and a pH value of 4.4. The liquor from the light bone filter, with a dextrose content of 82.7%, passes to the light vacuum pan 6 where it is concentrated to a density of about 28° Baumé. It may leave the light vacuum pan with a dextrose content of 81.6%. It passes to the heavy bone filter 7 from which it goes to the finishing pan 8 with a dextrose content of 80.3% and a pH value of 4.4.

The finishing pan is assumed to handle 73,000 pounds of liquor. Into this liquor is introduced 50 pounds of 28% hydrochloric acid. The liquor issuing from the finishing pan goes to the cooler with a dextrose content of 82.5%, a pH value of 4.1 and a density of 38.5° Baumé.

Experiments have shown that if the acid had not been added to the liquor, and the liquor had been concentrated to the usual 40° Baumé, the liquor going from the finishing pan to the cooler would have had a dextrose content of 78.2% instead of 82.5%, so that the improved process of the present invention gives a net increase in dextrose content of 4.3%.

The liquor passes from the cooler 9 to crystallizer 10, which ordinarily contains foots from a previous crystallizing operation, the liquor being cooled so that the mixture of converter liquor and foots will have the proper temperature for initiating crystallization as described in Patent No. 1,521,830 above referred to. When the crystallizing operation is complete, the batch (except the portion retained as seed for the next operation) is delivered to centrifugal machines 11 where the mother liquor (first greens) is spun out as far as possible, after which fresh water is introduced into the machines to remove the residual mother liquor. 10 gallons of water may be used per machine which is less than has been customary. The wash water (sweet water) from the centrifugal machines passes through conduit 12 to the light bone filter 5. The sugar goes to a drier 13. The mother liquor from centrifugals 11 passes through conduit 14 to the refining and concentrating operations 15, precedent to a second crystallization at 16. The preliminary operations may include reconversion in an autoclave and neutralization. The massecuite from crystallizer 16 (saving a part for seeding the next batch) goes to the second sugar centrifugal 17 where the hydrol is spun off. The sugar ordinarily is not washed but goes to the melter 18 and from there through conduit 19 to the light bone filter 5.

The invention is of value particularly in processes involving conversions at densities substantially above the optimum density. Where the conversion is at or near the optimum density, the dextrose content instead of being reduced in the second stages of the process may even be increased. Experiment has shown that with a 10° Baumé conversion the liquor from the neutralizer may have a dextrose content of 86.4% which is reduced by the addition of wash water and melted second sugar to 84.3, but is increased to 86.6 as it passes from the light bone filter 5, to 87.6 in going to the heavy bone filter 7 and to 88.6 in leaving the heavy bone filter 7. This sugar is increased only to 88.7 by addition of acid to the finishing pan.

Several advantages result from increasing the dextrose content, as above described, particularly where there is a lower crystallizing density. The reduction in density during the crystallizing operation facilitates the continued de-polymerization of the loosely bound polysaccharides. With the liquor to be crystallized at higher purity, the mother liquor will be purer and this results in a purer final product. A massecuite crystallized at low density is easier to purge and wash than one crystallized from a higher density liquor. Consequently the amount of wash water used may be reduced and this reduces erosion of the crystals and gives a whiter and more brilliant sugar. As the amount of wash water is reduced, there is less liquor to be pumped through the various steps of the process and less water to be evaporated in order to bring the liquors to the proper density for crystallization. The lower crystallizing density reduces, naturally, the cost of concentration.

It will be understood that the specific example of the operation of the process of the invention given in connection with the description of the flow sheet is purely typical and informative. The invention is not to be regarded as limited to the particular operating data given. The intention is to claim all equivalents and all modifications within the scope of the appended claims.

While the invention has been described as employing the ordinary commercial conversion densities of 12°–14° Baumé, the principles of the invention might be utilized if the conversion densities were considerably higher than normal, for example, as high as 16°–18° Baumé, in which case the reduction in dextrose content during the refining and concentrating steps would be still greater than with a 12°–14° Baumé conversion. Too high conversion density would give rise to difficulties so that the preferred conversion density for the present invention is within the present day range of 12°–14° Baumé.

Applicant is aware of application of Charles J. Copland, filed May 19, 1938, Serial No. 208,823, and makes no claim to the invention disclosed therein; applicant's invention being for certain improvements upon the Copland invention. This application is a continuation in part of applicant's copending application, Serial No. 187,659, filed January 29, 1938, and is filed as a substitute therefor.

I claim:

1. In a process for the production of dextrose in which starch is converted with an acid and the converter liquor neutralized, refined and concentrated with heat in a vacuum pan, under conditions which bring about polymerization of dextrose, and the liquor subjected to a crystallizing operation: the improvement which comprises adding acid to the liquor in the vacuum pan to de-polymerize the polysaccharides and thereby increase the dextrose content of the liquor.

2. In a process for the production of dextrose in which starch is converted with an acid and the converter liquor neutralized, given adsorption treatments and concentrated in light and finishing vacuum pans, under conditions which bring about polymerization of dextrose, and the liquor subjected to a crystallizing operation: the improvement which comprises adding acid to the liquor in the finishing pan to de-polymerize the polysaccharides and thereby increase the dextrose content of the liquor.

3. In a process for the production of dextrose in which starch is converted with an acid and the converter liquor neutralized, refined and concentrated under conditions which bring about polymerization of dextrose, and the liquor subjected to a crystallizing operation: the improvement which comprises adding an acid to the liquor after neutralization and with the liquor at a pressure not substantially in excess of atmospheric pressure to de-polymerize the polysaccharides and thereby increase the dextrose content of the liquor; and crystallizing the liquor at a density below 40° Baumé in proportion substantially to the increase in dextrose content brought about by said de-polymerization.

4. In a process for the production of dextrose in which starch is converted with an acid and the converter liquor neutralized, refined and concentrated with heat in a vacuum pan, under conditions which bring about polymerization of dextrose, and the liquor subjected to a crystallizing operation: the improvement which comprises adding acid to the liquor in the vacuum pan to de-polymerize the polysaccharides and thereby increase the dextrose content of the liquor; and crystallizing the liquor at a density below 40° Baumé in proportion substantially to the increase in dextrose content brought about by said de-polymerization.

5. In a process for the production of dextrose in which a starch water suspension at a density substantially above 9.5° Baumé is converted with an acid and the converter liquor neutralized, refined and concentrated and then subjected to a crystallizing operation: the improvement which comprises adding an acid to the liquor after neutralization to de-polymerize polysaccharides; and crystallizing the liquor at a density substantially below 40° Baumé.

6. In a process for the production of dextrose in which a starch water suspension at a density of about 12°–14° Baumé is converted with an acid and the converter liquor neutralized, refined and concentrated and then subjected to a crystallizing operation: the improvement which comprises adding an acid to the liquor after neutralization and before crystallization to de-polymerize polysaccharides and thereby increase the dextrose content of the liquor; and crystallizing the liquor at a density of about 38.5° Baumé.

7. In the production of dextrose by conversion of starch with an acid, the improvement which consists in introducing an acid into the converter liquor and heating the same at a pressure not exceeding atmospheric pressure to de-polymerize polysaccharides and thereby increase the dextrose content of the liquor.

8. Process for the production of dextrose which comprises converting a starch water suspension having a density substantially above 9.5° Baumé, at a pressure substantially above atmospheric pressure in contact with a hydrolyzing acid; neutralizing and filtering the converter liquor; subjecting it to light bone filtration, a light vacuum pan concentration, a heavy bone filtration and concentrating it in a finishing pan to a density substantially below 40° Baumé; introducing an acid into the finishing pan to de-polymerize polysaccharides; crystallizing the liquor with slow agitation, centrifuging the massecuite to remove most of the mother liquor; and washing the crystals with water.

9. In a process for the production of dextrose in which starch is converted with an acid and the converter liquor neutralized, refined and concentrated under conditions which bring about polymerization of dextrose, and the liquor subjected to a crystallizing operation: the improvement which comprises adding an acid to the liquor after neutralization and heating the liquor at a pressure not in excess of atmospheric pressure to de-polymerize the polysaccharides and thereby increase the dextrose content of the liquor.

10. In a process for the production of dextrose in which starch is converted with an acid and the converter liquor neutralized, refined, concentrated, subjected to a crystallizing operation and the mother liquor separated from the solid phase dextrose under conditions which bring about polymerization of dextrose: the improvement which comprises adding an acid to the material in process after the neutralization step and prior to the separation of the mother liquor from the solid phase dextrose to de-polymerize the polysaccharides and thereby increase the dextrose content of the liquor to be crystallized.

SIDNEY MARK CANTOR.